(12) United States Patent
Bushman

(10) Patent No.: US 9,304,864 B1
(45) Date of Patent: Apr. 5, 2016

(54) CAPTURING POST-SNAPSHOT QUIESCENCE WRITES IN AN IMAGE BACKUP

(71) Applicant: STORAGECRAFT TECHNOLOGY CORPORATION, Draper, UT (US)

(72) Inventor: Nathan S. Bushman, Pleasant Grove, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 0 days.

(21) Appl. No.: 14/733,505

(22) Filed: Jun. 8, 2015

(51) Int. Cl.
 *G06F 17/30* (2006.01)
 *G06F 11/14* (2006.01)
 *G06F 15/16* (2006.01)

(52) U.S. Cl.
 CPC ...... *G06F 11/1446* (2013.01); *G06F 17/30678* (2013.01); *G06F 17/30864* (2013.01); *G06F 2201/84* (2013.01)

(58) Field of Classification Search
 None
 See application file for complete search history.

(56) References Cited

U.S. PATENT DOCUMENTS

| | | | |
|---|---|---|---|
| 8,326,803 B1 * | 12/2012 | Stringham | 707/652 |
| 8,719,521 B1 | 5/2014 | Barnes et al. | |
| 8,943,441 B1 | 1/2015 | Patrick et al. | |
| 2005/0066225 A1 | 3/2005 | Rowan et al. | |
| 2007/0156985 A1 | 7/2007 | Tsai et al. | |
| 2007/0185940 A1 * | 8/2007 | Prahlad et al. | 707/204 |
| 2010/0049930 A1 | 2/2010 | Pershin et al. | |
| 2010/0145909 A1 | 6/2010 | Ngo | |
| 2011/0093478 A1 * | 4/2011 | Starks et al. | 707/754 |
| 2011/0161299 A1 * | 6/2011 | Prahlad et al. | 707/649 |
| 2014/0006858 A1 | 1/2014 | Helfman et al. | |

OTHER PUBLICATIONS

U.S. Office Action mailed Jul. 23, 2015 in U.S. Appl. No. 14/733,505.
U.S. Office Action mailed Aug. 25, 2015 in U.S. Appl. No. 14/733,611.
U.S. Office Action mailed Aug. 7, 2015 in U.S. Appl. No. 14/733,628.

* cited by examiner

*Primary Examiner* — Alex Gofman
(74) *Attorney, Agent, or Firm* — Maschoff Brennan

(57) ABSTRACT

Capturing post-snapshot quiescence writes in an image backup. In one example embodiment, a method for capturing post-snapshot quiescence writes in an image backup may include taking a first snapshot of a source storage at a first point in time, identifying a first set of block positions of blocks that are allocated in the source storage at the first point in time, identifying a second set of block positions of blocks that are written to the first snapshot during post-snapshot quiescence of the first snapshot, resulting in a first quiesced snapshot, calculating a third set of block positions by performing a Boolean OR operation on the first set of block positions and the second set of block positions, and copying blocks in the third set of block positions from the first snapshot to a full image backup.

16 Claims, 13 Drawing Sheets

CAPTURING POST-SNAPSHOT QUIESCENCE WRITES IN AN IMAGE BACKUP

FIELD

The embodiments disclosed herein relate to capturing post-snapshot quiescence writes in an image backup.

BACKGROUND

A storage is computer-readable media capable of storing data in blocks. Storages face a myriad of threats to the data they store and to their smooth and continuous operation. In order to mitigate these threats, a backup of the data in a storage may be created to represent the state of the source storage at a particular point in time and to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up individual files may be scattered, resulting in relatively extensive seeking.

One way to accomplish image backup is using a snapshot, which enables the state of the source storage at a particular point in time to be captured without interrupting other processes, thus avoiding downtime of the source storage. Many snapshots employ a "copy on write" methodology which requires that every write command, received by the source storage during a snapshot operation, be delayed until the original data block at the location targeted by the write command is copied for safekeeping to a new location. In this manner, the copied original blocks stored in the new location, as well as the unchanged original blocks stored in the source storage, are "frozen" at the snapshot time and define the "snapshot," which can then be employed in the creation of an image backup of the source storage. Then, once the image backup has been created, the data blocks that were copied as part of the snapshot can be discarded.

One common problem with using a snapshot during the creation of an image backup is that the source storage may not be in an ideal state at the snapshot time. For example, a snapshot may be created before an application has saved data to the source storage that would be useful during a restore of an image backup. This useful data will therefore not be included in the snapshot and therefore be missing from the image backup that is created based on the snapshot.

To mitigate a source storage not being in an ideal state at a snapshot time, post-snapshot quiescence technology has been developed to modify a snapshot to place the snapshot in an improved state for the creation of an image backup. For example, some platforms may permit software applications to issue write operations to the snapshot after the snapshot has been created. This enables these software applications to perform post-snapshot quiescence writes to the snapshot before the snapshot is used in the creation of an image backup. However, since each successive image backup in an image backup chain typically depends on prior image backups representing the exact state of the source storage at the snapshot time, and since post-snapshot quiescence technology causes a snapshot to no longer represent the exact state of the source storage at the snapshot time, post-snapshot quiescence technology is not typically employed in creating an image backup chain. Therefore, individual image backups in an image backup chain lack the improved state afforded by post-snapshot quiescence technology, and therefore are not as useful when it comes time to restore the image backup chain to a restore storage.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to capturing post-snapshot quiescence writes in an image backup. The example embodiments disclosed herein may be employed to create one or more image backups in an image backup chain with at least some of the image backups in the image backup chain representing the source storage in a post-snapshot quiescence state. Including image backups in the image backup chain that represent the source storage in a post-snapshot quiescence state may make the image backup chain more useful when it comes time to restore the image backup chain to a restore storage.

In one example embodiment, a method for capturing post-snapshot quiescence writes in an image backup may include taking a first snapshot of a source storage at a first point in time, identifying a first set of block positions of blocks that are allocated in the source storage at the first point in time, identifying a second set of block positions of blocks that are written to the first snapshot during post-snapshot quiescence of the first snapshot, resulting in a first quiesced snapshot, calculating a third set of block positions by performing a Boolean OR operation on the first set of block positions and the second set of block positions, and copying blocks in the third set of block positions from the first snapshot to a full image backup.

In another example embodiment, a method for capturing post-snapshot quiescence writes in an image backup may include taking a first snapshot of a source storage at a first point in time, accessing a first file system block allocation map (FSBAM) of the source storage from the first point in time that identifies block positions of blocks that are allocated in the source storage at the first point in time, accessing a first quiescence map of the first snapshot that identifies block positions of blocks that are written to the first snapshot during post-snapshot quiescence of the first snapshot, resulting in a first quiesced snapshot, calculating full backup block positions by performing a Boolean OR operation on the first FSBAM and the first quiescence map, and copying blocks in the full backup block positions from the first snapshot to a full image backup.

It is to be understood that both the foregoing general description and the following detailed description are explanatory and are not restrictive of the invention as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
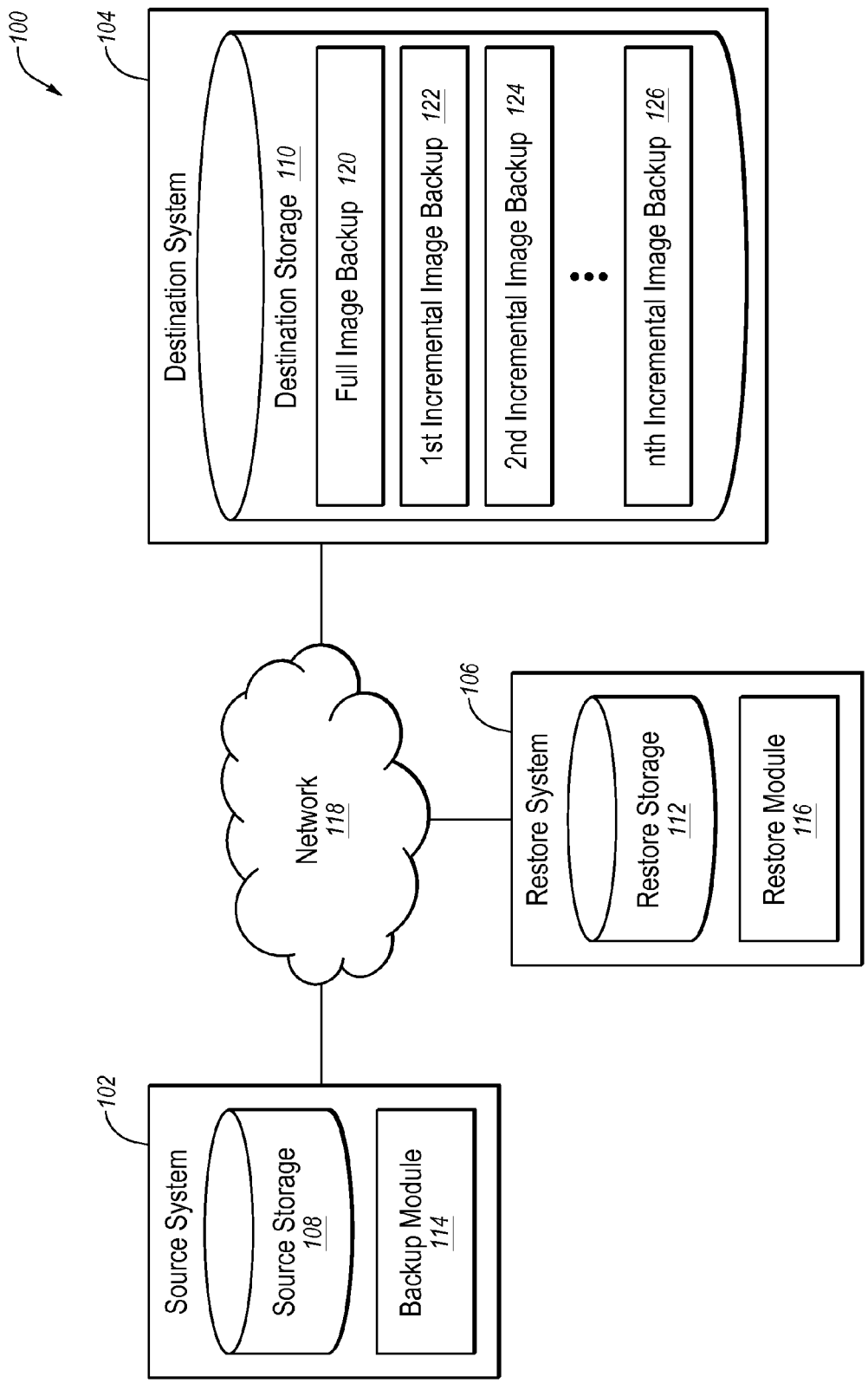
FIG. 1 is a schematic block diagram illustrating an example image backup and restore system.

The term "storage" as used herein refers to computer-readable media capable of storing data in blocks, such as one or more floppy disks, optical disks, magnetic disks, or solid state (flash) disks, or some logical portion thereof such as a volume. The term "block" as used herein refers to a fixed-length discrete sequence of bits. In some file systems, blocks are sometimes referred to as "clusters." In some example embodiments, the size of each block may be configured to match the standard sector size of a storage on which the block is stored. For example, the size of each block may be 512 bytes (4096 bits) where 512 bytes is the size of a standard sector. In other example embodiments, the size of each block may be configured to be a multiple of the standard sector size of a storage on which the block is stored. For example, the size of each block may be 4096 bytes (32,768 bits) where 512 bytes (4096 bits) is the size of a standard sector, which results in each block including eight sectors. In some file systems, a block is the allocation unit of the file system, with the allocated blocks and free blocks being tracked by the file system. The term "allocated block" as used herein refers to a block in a storage that is currently tracked as storing data by a file system of the storage. The term "free block" as used herein refers to a block in a storage that is not currently tracked as storing data by a file system of the storage. The term "backup" when used herein as a noun refers to a copy or copies of one or more blocks from a storage. The term "full backup" as used herein refers to a full backup of a storage that includes at least a copy of each unique allocated block of the storage at a point in time such that the full backup can be restored on its own to recreate the state of the storage at the point in time, without being dependent on any other backup. A "full backup" may also include nonunique allocated blocks and free blocks of the storage at the point in time. An example file format for a "full backup" is the ShadowProtect Full (SPF) image backup format. The term "incremental backup" as used herein refers to an at least partial backup of a storage that includes at least a copy of each unique allocated block of the storage that was modified between a previous point in time of a previous backup of the storage and the subsequent point in time of the incremental backup, such that the incremental backup, along with all previous backups of the storage, including an initial full backup of the storage, can be restored together as an incremental image backup chain to recreate the state of the storage at the subsequent point in time. An "incremental backup" may also include nonunique allocated blocks and free blocks of the storage that were modified between the previous point in time and the subsequent point in time. An example file format for an "incremental backup" is the ShadowProtect Incremental (SPI) image backup format. The term "modified block" as used herein refers to a block that was modified either because the block was previously allocated and changed or because the block was modified by being newly allocated and changed. The term "decremental backup" as used herein refers to an at least partial backup of a storage that includes at least a copy of each unique allocated block from a full backup of the storage that corresponds to a block that was modified in the source storage between a previous point in time and a subsequent point in time, such that the decremental backup, along with all subsequent decremental backups of the storage, including a full backup of the storage, can be restored together as a decremental image backup chain to recreate the state of the storage at the previous point in time. A "decremental backup" may also include nonunique allocated blocks and free blocks from a full backup of the storage that correspond to blocks that were modified in the source storage between the point in time and the subsequent point in time. It is understood that a "full backup," an "incremental backup," and/or a "decremental backup" may exclude certain undesired allocated blocks such as blocks belonging to files whose contents are not necessary for restoration purposes, such as virtual memory pagination files and machine hibernation state files.

FIG. 1 is a schematic block diagram illustrating an example image backup and restore system 100. As disclosed in FIG. 1, the system 100 may include a source system 102, a destination system 104, and a restore system 106. The systems 102, 104, and 106 may include storages 108, 110, and 112, respectively. The source system 102 may also include a backup module 114 and the restore system 106 may also include a restore module 116. The systems 102, 104, and 106 may be configured to communicate with one another over a network 118.

The destination storage 110 may store one or more image backups of the source storage 108. For example, the destination storage 110 may store a full image backup 120, a 1st incremental image backup 122, a 2nd incremental image backup 124, and an nth incremental image backup 126, which together make up an incremental image backup chain. The full image backup 120 may represent the state of the source storage at time t(1), the 1st incremental image backup 122 may represent the state of the source storage at time t(2), the 2nd incremental image backup 124 may represent the state of the source storage at time t(3), and the nth incremental image backup 126 may represent the state of the source storage at time t(n+1). Any of the image backups 120-126 may be restored to the restore storage 112.

Each of the systems 102, 104, and 106 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, flash memory drives, and virtual machines. The network 118 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof. The network 118 may also be a network emulation of a hypervisor over which one or more virtual machines and/or physical machines may communicate.

The incremental image backup chain stored in the destination storage 110 may be created by the backup module 114. For example, the backup module 114 may be one or more programs that are configured, when executed, to cause one or more processors to perform image backup operations of creating a full image backup and multiple incremental image backups of the source storage 108. It is noted that these image backups may initially be created on the source system 102 and then copied to the destination system 104.

For example, the full image backup 120 may be created to capture the state at time t(1). This image backup operation may include the backup module 114 copying all unique allocated blocks of the source storage 108 as allocated at time t(1) and storing the unique allocated blocks in the destination storage 110, or verifying that the unique allocated blocks are already stored in the destination storage 110. The state of the source storage 108 at time t(1) may be captured using the snapshot methods disclosed herein in order to capture the blocks stored in the source storage 108 at time t(1) without interrupting other processes, thus avoiding downtime of the source storage 108. The full image backup 120 may be relatively large depending on the size of the source storage 108 and the number of allocated blocks at time t(1). As a result, the full image backup 120 may take a relatively long time to create and consume a relatively large amount of space in the destination storage 110.

Next, the 1st and 2nd incremental image backups 122 and 124 may be created to capture the states at times t(2) and t(3), respectively. This may include copying only modified unique allocated blocks of the source storage 108 present at time t(2) and storing the modified unique allocated blocks in the destination storage 110, or verifying that the modified unique allocated blocks are already stored in the destination storage 110, then later copying only modified unique allocated blocks of the source storage 108 present at time t(3) and storing the modified unique allocated blocks in the destination storage 110, or verifying that the modified unique allocated blocks are already stored in the destination storage 110. The states of the source storage 108 at times t(2) and t(3) may also be captured using the snapshot methods disclosed herein, thus avoiding downtime of the source storage 108. Each incremental image backup may include only those unique allocated blocks from the source storage 108 that were modified after the time of the previous image backup. Thus, the 1st incremental image backup 122 may include only those unique allocated blocks from the source storage 108 that were modified between time t(1) and time t(2), and the 2nd incremental image backup 124 may include only those unique allocated blocks from the source storage 108 that were modified between time t(2) and time t(3). In general, as compared to the full image backup 120, each incremental image backup may take a relatively short time to create and consume a relatively small storage space in the destination storage 110.

Finally, the nth incremental image backup 126 may be created to capture the state at time t(n+1). This may include copying only modified unique allocated blocks of the source storage 108 present at time t(n+1) using snapshot technology, and storing the modified unique allocated blocks in the destination storage 110, or verifying that the modified unique allocated blocks are already stored in the destination storage 110. The nth incremental image backup 126 may include only those unique allocated blocks from the source storage 108 that were modified between time t(n) and time t(n+1).

Therefore, incremental image backups may be created on an ongoing basis. The frequency of creating new incremental image backups may be altered as desired in order to adjust the amount of data that will be lost should the source storage 108 experience corruption of its stored blocks or become unavailable at any given point in time. The blocks from the source storage 108 can be restored to the state at the point in time of a particular incremental image backup by applying the image backups to the restore storage 112 from oldest to newest, namely, first applying the full image backup 120 and then applying each successive incremental image backup up to the particular incremental image backup. Alternatively, the blocks from the source storage 108 can be restored to the state at the point in time of a particular incremental image backup by applying the image backups to the restore storage 112 concurrently, namely, concurrently applying the full image backup 120 and each successive incremental image backup up to the particular incremental image backup.

Although only allocated blocks are included in the example incremental image backups discussed above, it is understood that in alternative implementations both allocated and free blocks may be backed up during the creation of a full image backup or an incremental image backup. This is typically done for forensic purposes, because the contents of free blocks can be interesting where the free blocks contain data from a previous point in time when the blocks were in use and allocated. Therefore, the creation of full image backups and incremental image backups as disclosed herein is not limited to allocated blocks but may also include free blocks.

Further, although only full image backups and incremental image backups are discussed above, it is understood that the source storage 108 may instead be backed up by creating a full image backup and one or more decremental image backups. Decremental image backups are created by initially creating a full image backup to capture the state at an initial point in time, then updating the full image backup to capture the state at a subsequent point in time by modifying only those blocks in the full image backup that were modified between the initial and subsequent points in time. Prior to the updating of the full image backup, however, any original blocks in the full image backup that correspond to the locations of the modified blocks are copied to a decremental image backup, thus enabling restoration of the source storage 108 at the initial point in time (by restoring the updated full image backup and then restoring the decremental image backup, or by concurrently restoring the updated full image backup and the decremental image backup) or at the subsequent point in time (by simply restoring the updated full image backup). Since restoring a single full image backup is generally faster than restoring a full image backup and one or more incremental or decremental image backups, creating decremental image backups instead of incremental image backups may enable the most recent image backup to be restored more quickly since the most recent image backup is always a full image backup instead of potentially being an incremental image backup. Therefore, the methods disclosed herein are not limited to implementation on incremental image backup chains, but may also include implementation on decremental image backup chains.

In one example embodiment, the destination system 104 may be a network server, the source system 102 may be a first desktop computer, the source storage 108 may be a volume on one or more magnetic hard drives of the first desktop computer, the restore system 106 may be a second desktop computer, the restore storage 112 may be a volume on one or more magnetic hard drives of the second desktop computer, and the network 118 may include the internet. In this example embodiment, the first desktop computer may be configured to periodically back up the volume of the first desktop computer over the internet to the network server as part of a backup job by creating the full image backup 120 and the multiple incremental image backups 122, 124, and 126 stored in the destination storage 110. The first desktop computer may also be configured to track incremental changes to its volume between backups in order to easily and quickly identify only those blocks that were modified for use in the creation of an incremental backup. The second desktop computer may also be configured to restore one or more of the image backups from the network server over the internet to the volume of the second desktop computer if the first desktop computer experiences corruption of its volume or if the first desktop computer's volume becomes unavailable.

Although only a single storage is disclosed in each of the systems 102, 104, and 106 in FIG. 1, it is understood that any of the systems 102, 104, and 106 may instead include two or more storages. Further, although the systems 102, 104, and 106 are disclosed in FIG. 1 as communicating over the network 118, it is understood that the systems 102, 104, and 106 may instead communicate directly with each other. For example, in some embodiments any combination of the systems 102, 104, and 106 may be combined into a single system, including embodiments where the source storage 108 represents the same storage as the restore storage 112. Further, although the backup module 114 and the restore module 116 are the only modules disclosed in the system 100 of FIG. 1, it is understood that the functionality of the modules 114 and 116 may be replaced or augmented by one or more similar modules residing on any of the systems 102, 104, or 106 or another system. Finally, although only a single source storage and a single restore storage are disclosed in the system 100 of FIG. 1, it is understood that the destination system 104 of FIG. 1 may be configured to simultaneously back up multiple source storages and/or to simultaneously restore to multiple restore storages. For example, where the destination system 104 is configured as a deduplication system (that is capable of removing duplicate blocks within image backups and/or is capable of removing duplicate blocks between image backups), the greater the number of storages that are backed up to the destination storage 110 of the destination system 104, the greater the likelihood for reducing redundancy and for reducing the overall number of blocks being backed up, resulting in corresponding decreases in the overall size requirements of the destination storage 110 and in the bandwidth overhead of transporting blocks to the destination storage 110.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2A:
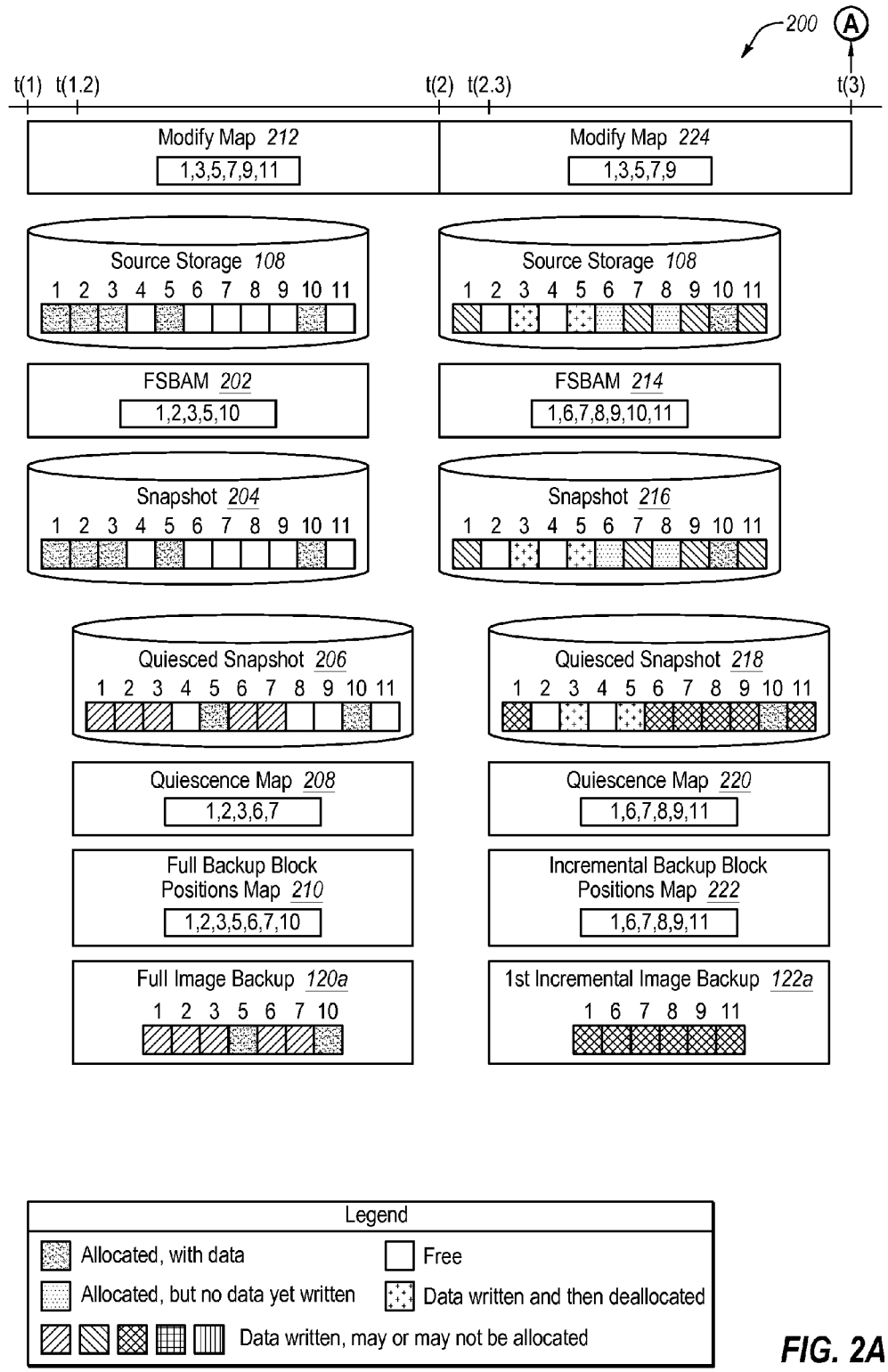
FIGS. 2A-2B are a schematic block diagram illustrating a timeline of capturing post-snapshot quiescence writes in an image backup.
Figure 2B:
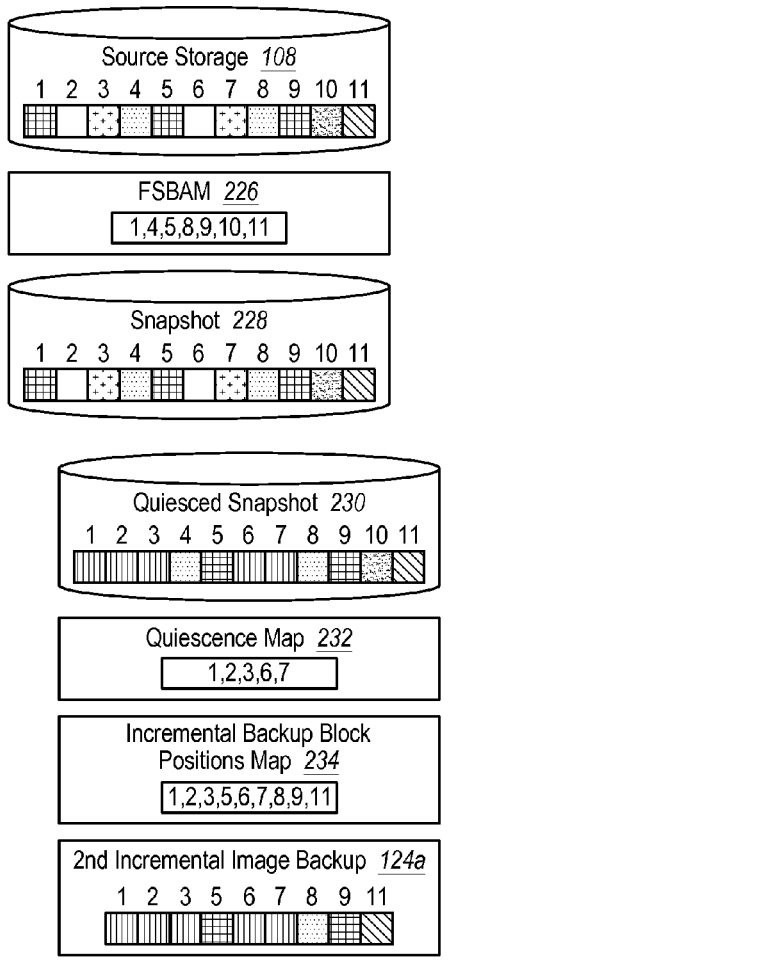
Figure 2C:
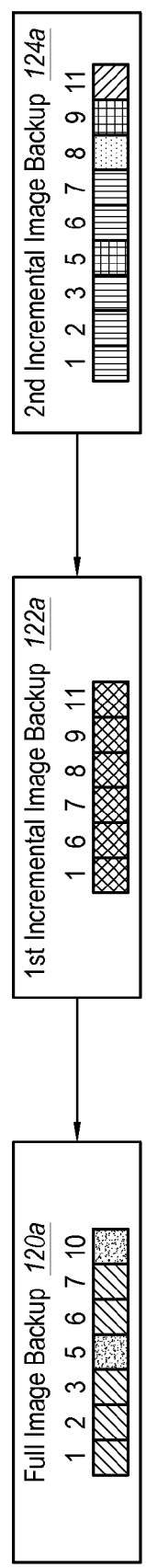
FIG. 2C is a schematic block diagram illustrating a linear image backup chain resulting from the timeline of FIGS. 2A-2B.

FIGS. 2A-2B are a schematic block diagram illustrating a timeline 200 of capturing post-snapshot quiescence writes in an image backup. FIG. 2C is a schematic block diagram illustrating a linear image backup chain 201 resulting from the timeline 200 of FIGS. 2A-2B. In particular, FIGS. 2A-2B disclose the states of the source storage 108 at times t(1), t(1.2), t(2), t(2.3), t(3), and t(3.1). The full image backup 120a represents the state of the source storage 108 at time t(1), the 1st incremental image backup 122a represents the state of the source storage at time t(2), and the 2nd incremental image backup 124a represents the state of the source storage at time t(3). However, as discussed in greater detail below, each of the image backups 120a, 122a, and 124a additionally includes post-snapshot quiescence modifications, which makes the linear image backup chain 201 of FIG. 2C (which is made up of the image backups 120a, 122a, and 124a) more useful when it comes time to restore one or more backups in the linear image backup chain 201 to the restore storage 112 of FIG. 1.

As disclosed in FIG. 2A, the state of the source storage 108 at time t(1) includes allocated blocks in positions (1), (2), (3), (5), and (10) and free blocks at positions (4), (6), (7), (8), (9), and (11). These allocated blocks are reflected in a file system block allocation map (FSBAM) 202 at time t(1), which identifies block positions of blocks that are allocated in the source storage 108 at time t(1). At time t(1), a snapshot 204 is taken of the source storage 108, which initially captures the state of the source storage at time t(1). The FSBAM 202 may be stored in the snapshot 204, or it may be stored separately from the snapshot 204.

Between time t(1) and time t(1.2), the state of the snapshot 204 is modified by post-snapshot quiescence writes to the blocks in positions (1), (2), (3), (6), and (7), resulting in a quiesced snapshot 206 at time t(1.2). These post-snapshot quiescence writes are reflected in a quiescence map 208, which identifies block positions of blocks that are written to the snapshot 204 during post-snapshot quiescence of the snapshot 204, resulting in the quiesced snapshot 206.

For example, on Microsoft Windows platforms, a Volume Shadow Copy Service (VSS) framework may permit software applications, known as VSS Writers, to issue write operations to the snapshot 204 after the snapshot 204 has been created, indirectly through the VSS or directly from the VSS Writer. This enables the VSS or VSS Writers to perform post-snapshot quiescence writes to the snapshot 204 before the snapshot 204 is used in the creation of the full image backup 120, as discussed below. Examples of VSS Writers that may be employed using the example methods disclosed herein include an Active Directory (AD) service and a Hyper-V hypervisor.

It is understood that the snapshot 204 and the corresponding quiesced snapshot 206 may be implemented in a variety of ways. For example, the snapshot 204 and the corresponding quiesced snapshot 206 may be implemented as two completely separate snapshots as illustrated in FIG. 2A. Alternatively, the snapshot 204 and the corresponding quiesced snapshot 206 may be implemented as a single snapshot that stores both the original blocks, as stored in the snapshot 204 at time t(1), as well as blocks written as part of a post-snapshot quiescence of the snapshot 204 between time t(1) and time t(1.2), resulting in a single snapshot that may store two blocks for some individual block positions (i.e., the original block in the position at the time of the snapshot, as well as a new block written in the position during post-snapshot quiescence). In this implementation, reference to the "snapshot" refers to blocks written to the original snapshot prior to the post-snapshot quiescence of the snapshot, and reference to the "quiesced snapshot" refers to the blocks written as part of a post-snapshot quiescence of the snapshot. Alternatively, the snapshot 204 and the corresponding quiesced snapshot 206 may be implemented by maintaining, in the snapshot 204, the original blocks in the snapshot 204 that correspond to the blocks written during post-snapshot quiescence of the snapshot 204, and writing the blocks written during post-snapshot quiescence to the quiesced snapshot 206. In this implementation, the original blocks in the snapshot 204 that do not correspond to blocks written during post-snapshot quiescence may be maintained in either the snapshot 204 or exposed by or copied to the quiesced snapshot 206. Therefore, it is understood that any "snapshot" and corresponding "quiesced snapshot" herein may be implemented using any one of the above-noted implementations.

At time t(1.2), block positions for the full image backup 120a are calculated by performing a Boolean OR operation on the FSBAM 202 and the quiescence map 208. As used herein, the phrases "performing a Boolean OR operation" and "performing a Boolean AND operation" refers to performing the equivalent of these Boolean operations. For example, the Boolean operators OR and AND are generally applied to Boolean operands TRUE and FALSE, and Boolean operations themselves generally evaluate to either TRUE or FALSE. Therefore, in order to perform a Boolean operation on the FSBAM 202 and the quiescence map 208, the block positions may be converted to the equivalent of the TRUE and FALSE operands. This may be accomplished, for example, by considering the FSBAM 202 as a bitmap with values 1,1,1,0, 1,0,0,0,0,1,0, where a '1' bit represents an allocated block position, and a '0' bit represents a free block position. Similarly, the quiescence map may be considered as a bitmap with values 1,1,1,0,0,1,1,0,0,0,0, where a '1' bit represents a modified block position, and a '0' bit represents an original block position. Finally, a Boolean OR operation can be performed on these two bitmaps, where a '1' bit represents TRUE and a '0' bit represents FALSE, resulting in a bitmap of 1,1,1,0,1, 1,1,0,0,1,0, which is represented in full backup block positions map 210 listing positions (1), (2), (3), (5), (6), (7), and (10) at time t(1.2) or beyond.

Finally, the full image backup 120a can be created at time t(1.2) or beyond by copying blocks from the positions listed in the full backup block positions map 210 from the quiesced snapshot 206 to the full image backup 120a. The full image backup 120a of FIG. 2A therefore represents the state of the source storage 108 at time t(1), but with post-snapshot quiescence modifications, which may make the full image backup 120a more useful when it comes time to restore the full image backup 120a to the restore storage 112 of FIG. 1.

As disclosed in FIG. 2A, between time t(1) and time t(2), the source storage 108 is modified. In particular, blocks are written to positions (1), (3), (5), (7), (9), and (11). These writes between time t(1) and time t(2) are reflected in a modify map 212, which is used to track block positions of blocks that are modified in the source storage 108 between time t(1) and time t(2). In addition, prior to time t(2), the blocks in positions (3) and (5) are made free, and the blocks in positions (6) and (8) are allocated but data has not yet been written to these blocks, resulting in the state of the source storage 108 at time t(2) including allocated blocks in positions (1), (6), (7), (8), (9), (10), and (11) and free blocks at positions (2), (3), (4), and (5). These allocated blocks are reflected in an FSBAM 214 at time t(2), which identifies block positions of blocks that are allocated in the source storage 108 at time t(2). At time t(2), a snapshot 216 is taken of the source storage 108, which initially captures the state of the source storage at time t(2). The FSBAM 214 may be stored in the snapshot 216, or it may be stored separately from the snapshot 216.

Between time t(2) and time t(2.3), the state of the snapshot 216 is modified by post-snapshot quiescence writes to the blocks in positions (1), (6), (7), (8), (9), and (11), resulting in a quiesced snapshot 218. These post-snapshot quiescence writes are reflected in a quiescence map 220, which identifies block positions of blocks that are written to the snapshot 216 during post-snapshot quiescence of the snapshot 216, resulting in the quiesced snapshot 218 at time t(2.3).

At time t(2.3), block positions for the 1st incremental image backup 122a are calculated by performing a Boolean OR operation on the quiescence map 208 and the modify map 212, then performing a Boolean AND operation with the FSBAM 214, and then performing a Boolean OR operation with the quiescence map 220, which results in incremental backup block positions map 222 listing positions (1), (6), (7), (8), (9), and (11) at time t(2.3).

Finally, the 1st incremental image backup 122a can be created at time t(2.3) or beyond by copying blocks from the positions listed in the incremental backup block positions map 222 from the quiesced snapshot 218 to the 1st incremental image backup 122a. The 1st incremental image backup 122a of FIG. 2A therefore represents the state of the source storage 108 at time t(2), but with post-snapshot quiescence modifications, which may make the 1st incremental image backup 122a more useful when it comes time to restore the 1st incremental image backup 122a to the restore storage 112 of FIG. 1.

As disclosed in FIGS. 2A-2B, between time t(2) and time t(3), the source storage 108 is modified. In particular, blocks are written to positions (1), (3), (5), (7), and (9). These writes between time t(2) and time t(3) are reflected in a modify map 224, which is used to track block positions of blocks that are modified in the source storage 108 between time t(2) and time t(3). In addition, as disclosed in FIG. 2B, prior to time t(3), the blocks in positions (3) and (7) are made free, and the blocks in positions (4) and (8) are allocated but data has not yet been written to these blocks, resulting in the state of the source storage 108 at time t(3) including allocated blocks in positions (1), (4), (5), (8), (9), (10), and (11) and free blocks at positions (2), (3), (6), and (7). These allocated blocks are reflected in an FSBAM 226 at time t(3), which identifies block positions of blocks that are allocated in the source storage 108 at time t(3). At time t(3), a snapshot 228 is taken of the source storage 108, which initially captures the state of the source storage at time t(3). The FSBAM 226 may be stored in the snapshot 228, or it may be stored separately from the snapshot 228.

Between time t(3) and time t(3.1), the state of the snapshot 228 is modified by post-snapshot quiescence writes to the blocks in positions (1), (2), (3), (6), and (7), resulting in a quiesced snapshot 230 at time t(3.1). These post-snapshot quiescence writes are reflected in a quiescence map 232, which identifies block positions of blocks that are written to the snapshot 228 during post-snapshot quiescence of the snapshot 228, resulting in the quiesced snapshot 230.

At time t(3.1), block positions for the 2nd incremental image backup 124*a* are calculated by performing a Boolean OR operation on the quiescence map 220 and the modify map 224, then performing a Boolean AND operation with the FSBAM 226, and then performing a Boolean OR operation with the quiescence map 232, which results in incremental backup block positions map 234 listing positions (1), (2), (3), (5), (6), (7), (8), (9), and (11) at time t(3.1).

Finally, the 2nd incremental image backup 124*a* can be created at time t(3.1) or beyond by copying blocks from the positions listed in the incremental backup block positions map 234 from the quiesced snapshot 230 to the 2nd incremental image backup 124*a*. The 2nd incremental image backup 124*a* of FIG. 2B therefore represents the state of the source storage 108 at time t(3), but with post-snapshot quiescence modifications, which may make the 2nd incremental image backup 124*a* more useful when it comes time to restore the 2nd incremental image backup 124*a* to the restore storage 112 of FIG. 1.

As disclosed in FIG. 2C, the timeline 200 of FIGS. 2A-2B results in the linear image backup chain 201 in which the 2nd incremental image backup 124*a* depends on the 1st incremental image backup 122*a*, which depends on the full image backup 120*a*. Although the linear image backup chain 201 may be over-inclusive in that it may contain some blocks that are not needed in every restoration, the benefits of capturing the post-snapshot quiescence modifications in the linear image backup chain 201 may outweigh any increase in size due to over-inclusivity.

Figure 3A:
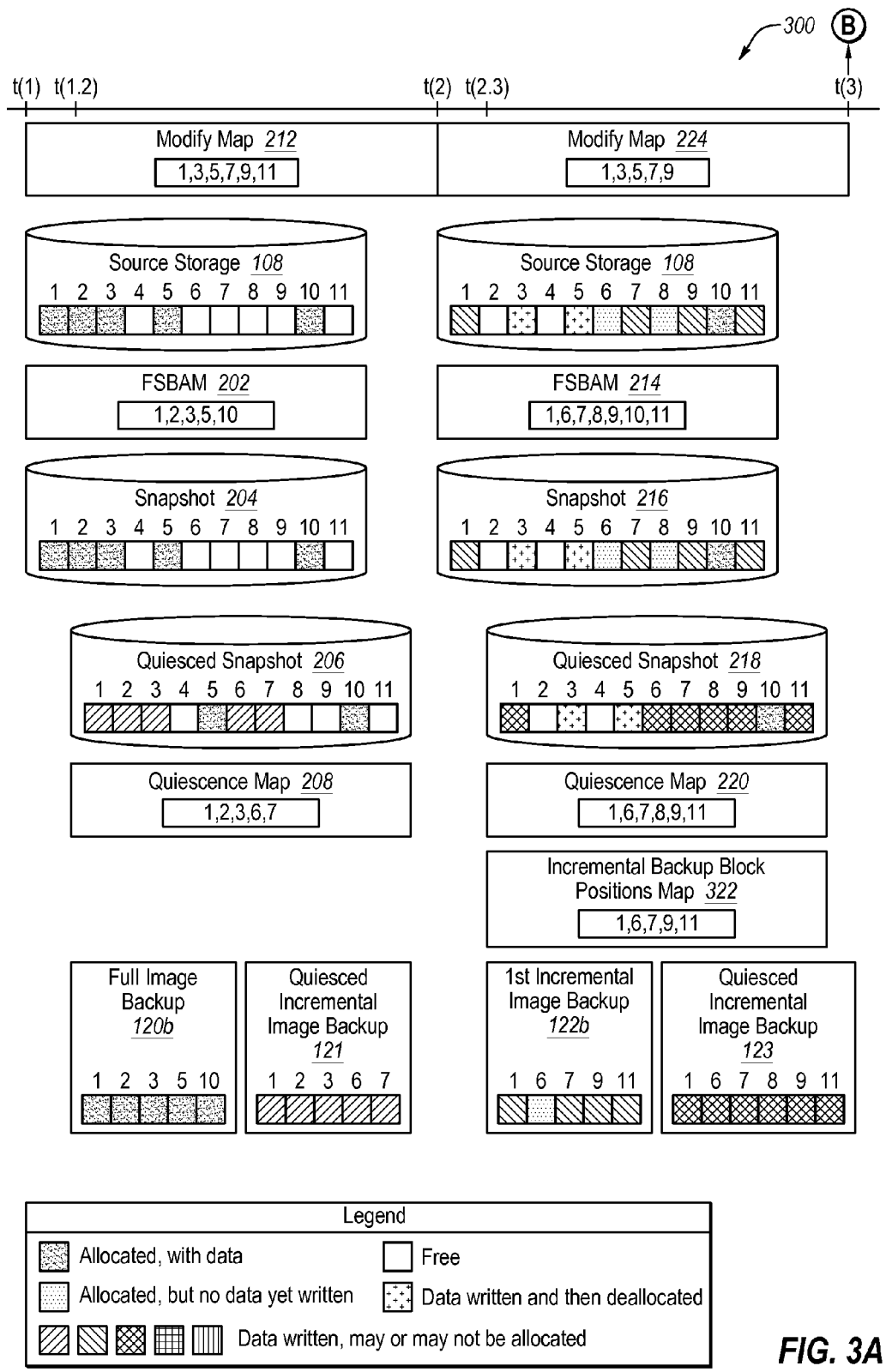
FIGS. 3A-3B are a schematic block diagram illustrating a timeline of capturing post-snapshot quiescence writes in a linear image backup chain.
Figure 3B:
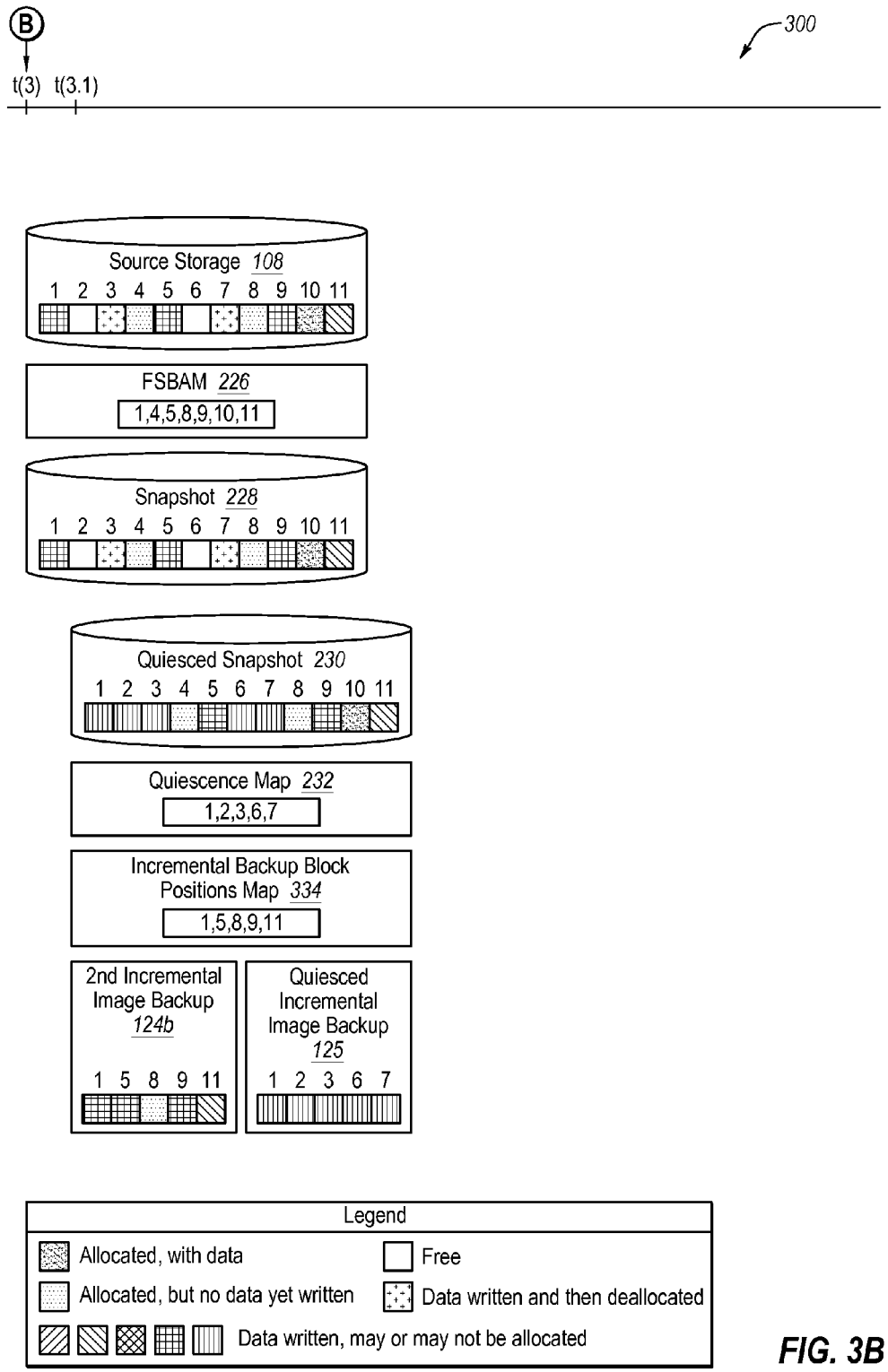
Figure 3C:
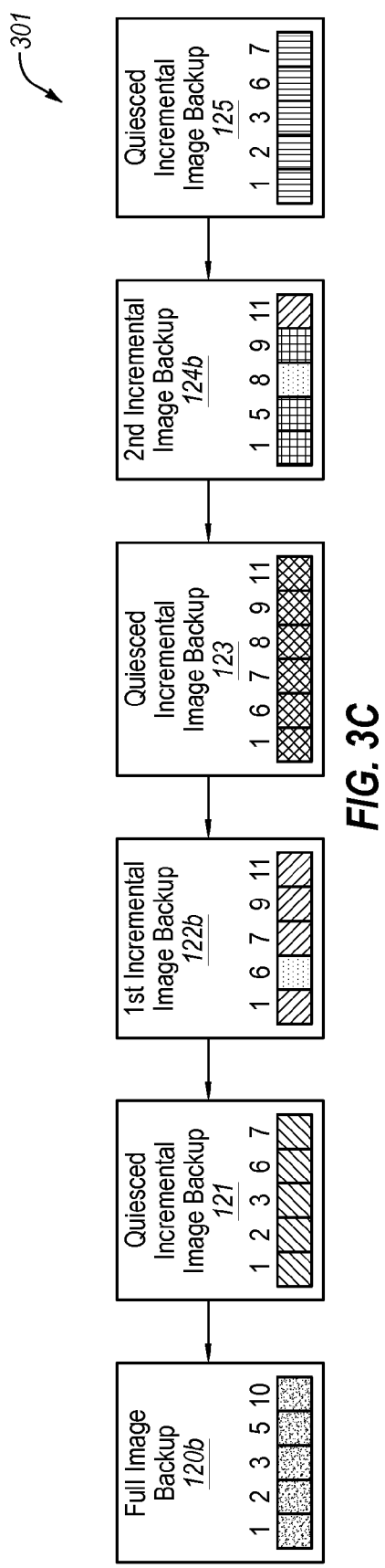
FIG. 3C is a schematic block diagram illustrating a linear image backup chain resulting from the timeline of FIGS. 3A-3B.

FIGS. 3A-3B are a schematic block diagram illustrating a timeline 300 of capturing post-snapshot quiescence writes in a linear image backup chain. FIG. 3C is a schematic block diagram illustrating a linear image backup chain 301 resulting from the timeline 300 of FIGS. 3A-3B. Since the timeline 300 of FIGS. 3A-3B is similar in many respects to the timeline 200 of FIGS. 2A-2B, those portions of the timeline 300 that differ from the timeline 200 will primarily be discussed in connection with FIGS. 3A-3B. FIGS. 3A-3B disclose the states of the source storage 108 at times t(1), t(1.2), t(2), t(2.3), t(3), and t(3.1), with the full image backup 120*b* representing the state of the source storage 108 at time t(1), the 1st incremental image backup 122*b* representing the state of the source storage at time t(2), and the 2nd incremental image backup 124*b* representing the state of the source storage at time t(3). However, as discussed in greater detail below, the image backups 120*b*, 122*b*, and 124*b* are paired with additional quiesced incremental image backups 121, 123, and 125 that include post-snapshot quiescence modifications, which makes the linear image backup chain 301 of FIG. 3C (which is made up of the image backups 120*b*, 122*b*, and 124*b* along with their paired quiesced incremental image backups 121, 123, and 125) more useful when it comes time to restore one or more backups in the linear image backup chain 301 to the restore storage 112 of FIG. 1.

As disclosed in FIG. 3A, the state of the source storage 108 at time t(1) includes allocated blocks and free blocks, which are reflected in the FSBAM 202 at time t(1). At time t(1), the snapshot 204 is taken of the source storage 108. Between time t(1) and time t(1.2), the state of the snapshot 204 is modified by post-snapshot quiescence writes, resulting in the quiesced snapshot 206 and reflected in the quiescence map 208.

At time t(1) or beyond, blocks identified in the FSBAM 202, namely the blocks in positions (1), (2), (3), (5), and (10), are copied from the snapshot 204 to the full image backup 120*b*. In addition, at time t(1.2) or beyond, blocks identified in the quiescence map 208, namely the blocks in positions (1), (2), (3), (6), and (7), are copied from the quiesced snapshot 206 to a quiesced incremental image backup 121. The full image backup 120*b* of FIG. 3A therefore represents the state of the source storage 108 at time t(1), and the quiesced incremental image backup 121 represents the post-snapshot quiescence modifications made to the snapshot 204, enabling the full image backup 120*b* and the quiesced incremental image backup 121 to be restored together, which may make the full image backup 120*b* more useful when it comes time to restore the full image backup 120*b* to the restore storage 112 of FIG. 1.

Between time t(1) and time t(2), the source storage 108 is modified, as reflected in the modify map 212, and allocated blocks at time t(2) are reflected in the FSBAM 214. At time t(2), the snapshot 216 is taken of the source storage 108. Between time t(2) and time t(2.3), the state of the snapshot 216 is modified by post-snapshot quiescence writes, resulting in the quiesced snapshot 218 at time t(2.3), and reflected in the quiescence map 220 at time t(2.3).

At time t(2) or beyond, block positions for the 1st incremental image backup 122*b* are calculated by performing a Boolean OR operation on the quiescence map 208 and the modify map 212, then performing a Boolean AND operation with the FSBAM 214, which results in incremental backup block positions map 322 listing positions (1), (6), (7), (9), and (11).

Finally, at time t(2) or beyond, blocks identified in the incremental backup block positions map 322, namely the blocks in positions (1), (6), (7), (9), and (11), are copied from the snapshot 216 to the 1st incremental image backup 122*b*. In addition, at time t(2.3) or beyond, blocks identified in the quiescence map 220, namely the blocks in positions (1), (6), (7), (8), (9), and (11), are copied from the quiesced snapshot 218 to a quiesced incremental image backup 123. The 1st incremental image backup 122*b* of FIG. 3A therefore represents the state of the source storage 108 at time t(2), and the quiesced incremental image backup 123 represents the post-snapshot quiescence modifications made to the snapshot 216, enabling the 1st incremental image backup 122*b* and the quiesced incremental image backup 123 to be restored together, which may make the 1st incremental image backup 122*b* more useful when it comes time to restore the 1st incremental image backup 122*b* to the restore storage 112 of FIG. 1.

As disclosed in FIGS. 3A-3B, between time t(2) and time t(3), the source storage 108 is modified, as reflected in the modify map 224, and allocated blocks at time t(3) are reflected in the FSBAM 226. At time t(3), the snapshot 228 is taken of the source storage 108. Between time t(3) and time t(3.1), the state of the snapshot 228 is modified by post-snapshot quiescence writes, resulting in the quiesced snapshot 230 at time t(3.1), and reflected in the quiescence map 232 at time t(3.1).

At time t(3) or beyond, block positions for the 2nd incremental image backup 124*b* are calculated by performing a Boolean OR operation on the quiescence map 220 and the modify map 224, then performing a Boolean AND operation with the FSBAM 226, which results in incremental backup block positions map 334 listing positions (1), (5), (8), (9), and (11).

Finally, at time t(3) or beyond, blocks identified in the incremental backup block positions map 334, namely the blocks in positions (1), (5), (8), (9), and (11), are copied from the snapshot 228 to the 2nd incremental image backup 124*b*. In addition, at time t(3.1) or beyond, blocks identified in the quiescence map 232, namely the blocks in positions (1), (2), (3), (6), and (7), are copied from the quiesced snapshot 230 to a quiesced incremental image backup 125. The 2nd incremental image backup 124*b* of FIG. 3B therefore represents the state of the source storage 108 at time t(3), and the quiesced incremental image backup 125 represents the post-snapshot quiescence modifications made to the snapshot 228, enabling the 2nd incremental image backup 124*b* and the quiesced incremental image backup 125 to be restored together, which may make the 2nd incremental image backup 124*b* more useful when it comes time to restore the 2nd incremental image backup 124*b* to the restore storage 112 of FIG. 1.

As disclosed in FIG. 3C, the timeline 300 of FIGS. 3A-3B result in the linear image backup chain 301 in which the quiesced incremental backup 125 depends on the 2nd incremental image backup 124*b*, which depends on the quiesced incremental image backup 123, which depends on the 1st incremental image backup 122*b*, which depends on the quiesced incremental image backup 121, which depends on the full image backup 120*b*. Although the linear image backup chain 301 may be over-inclusive in that it may contain some blocks that are not needed in every restoration, the benefits of capturing the post-snapshot quiescence modifications in the linear image backup chain 301 may outweigh any increase in size due to over-inclusivity. In addition, during restoration of the linear image backup chain 301, while all backup images in the linear image backup chain 301 may be employed, the validity of the restoration may be accomplished by ignoring intervening quiesced incremental image backups, which may increase the speed and decrease the overhead of the restoration. For example, where the quiesced incremental image backup 125 is restored, the restoration may ignore the intervening quiesced incremental image backup 123 and the intervening quiesced incremental image backup 121, and instead consider, for purposes of the restoration, the quiesced incremental image backup 125 to depend from the 2nd incremental image backup 124*b*, which depends on the 1st incremental image backup 122*b*, which depends on the full image backup 120*b*.

Figure 4A:
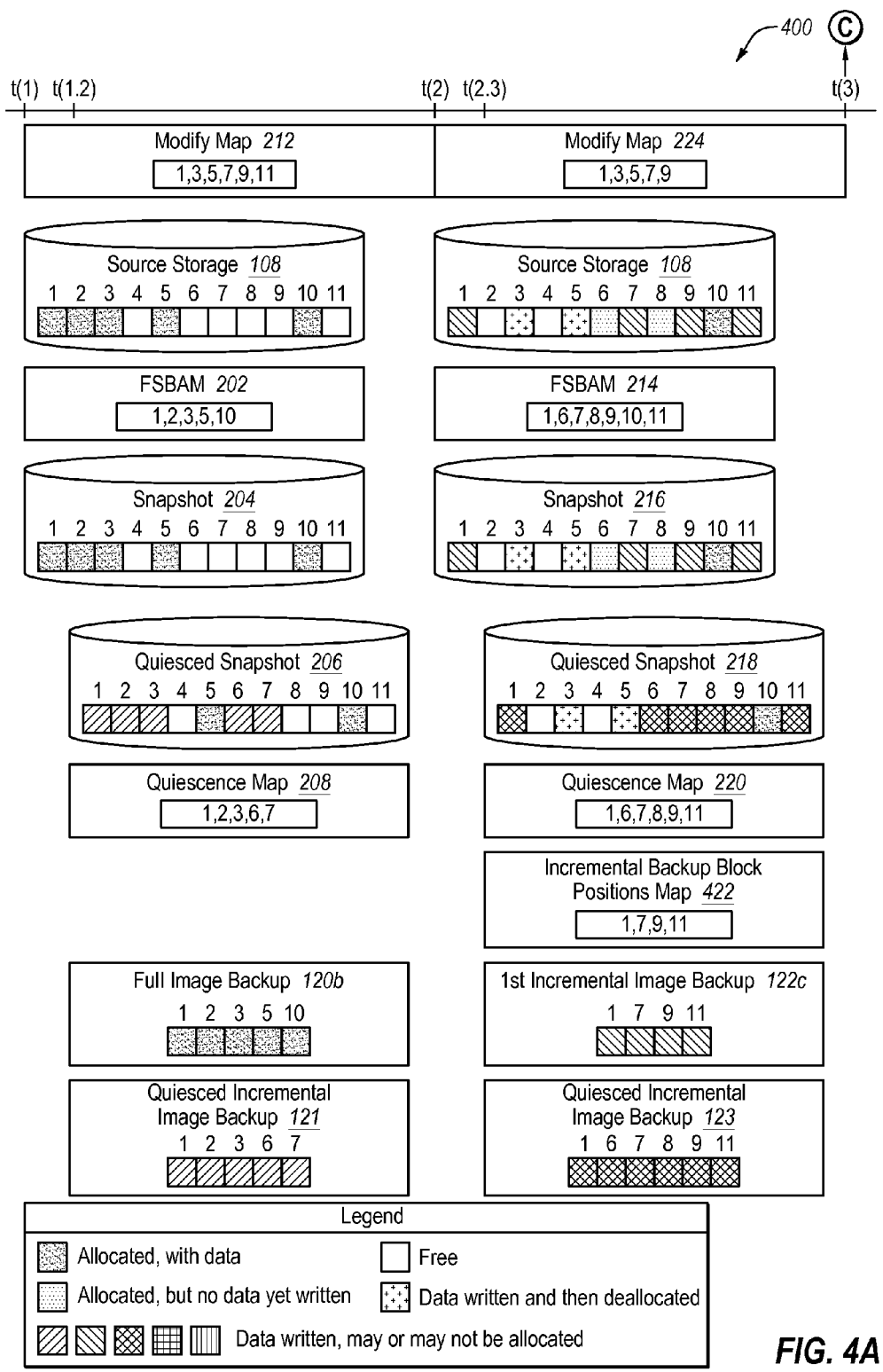
FIGS. 4A-4B are a schematic block diagram illustrating a timeline of capturing post-snapshot quiescence writes in a branching image backup chain.
Figure 4B:
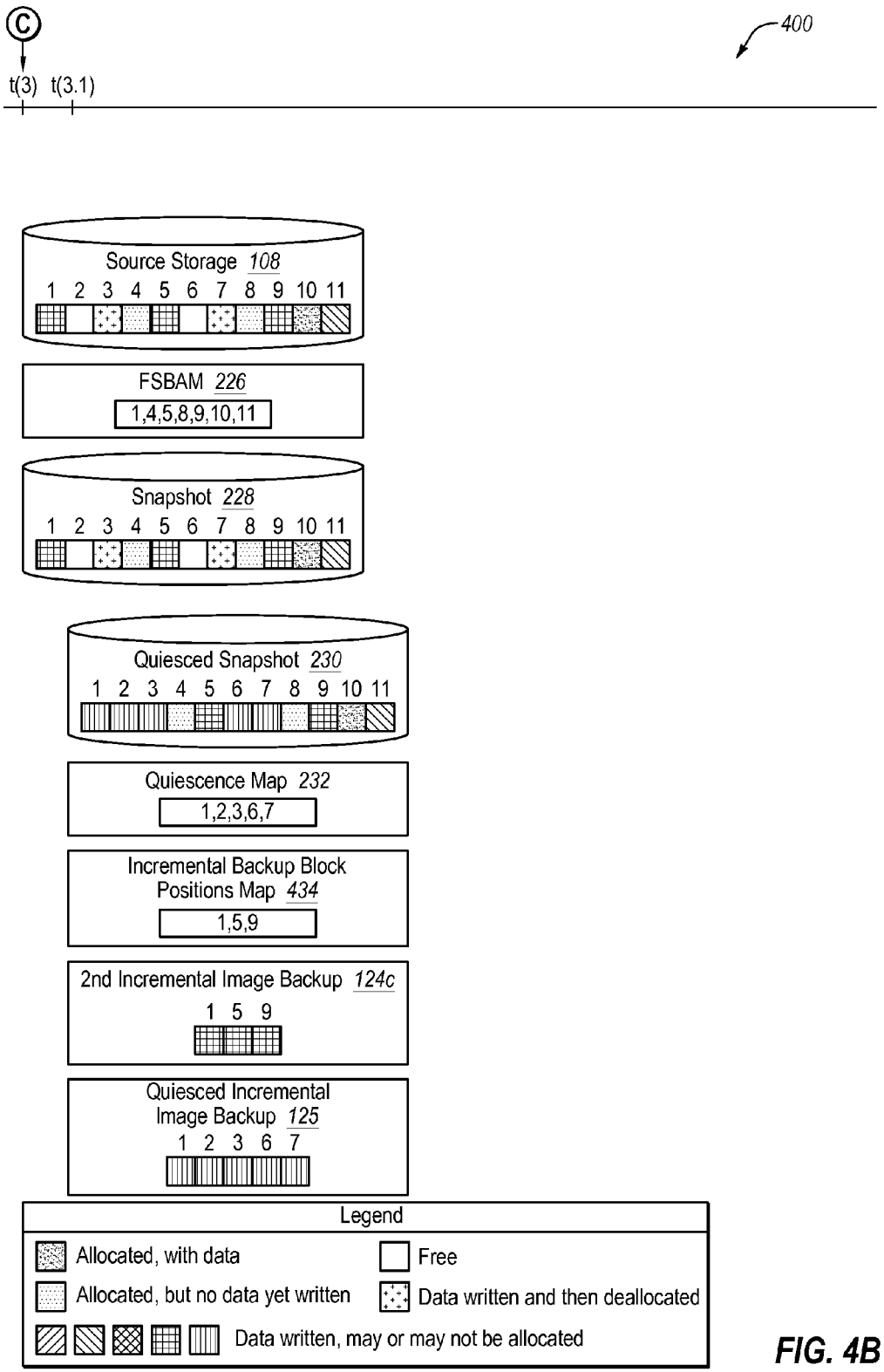
Figure 4C:
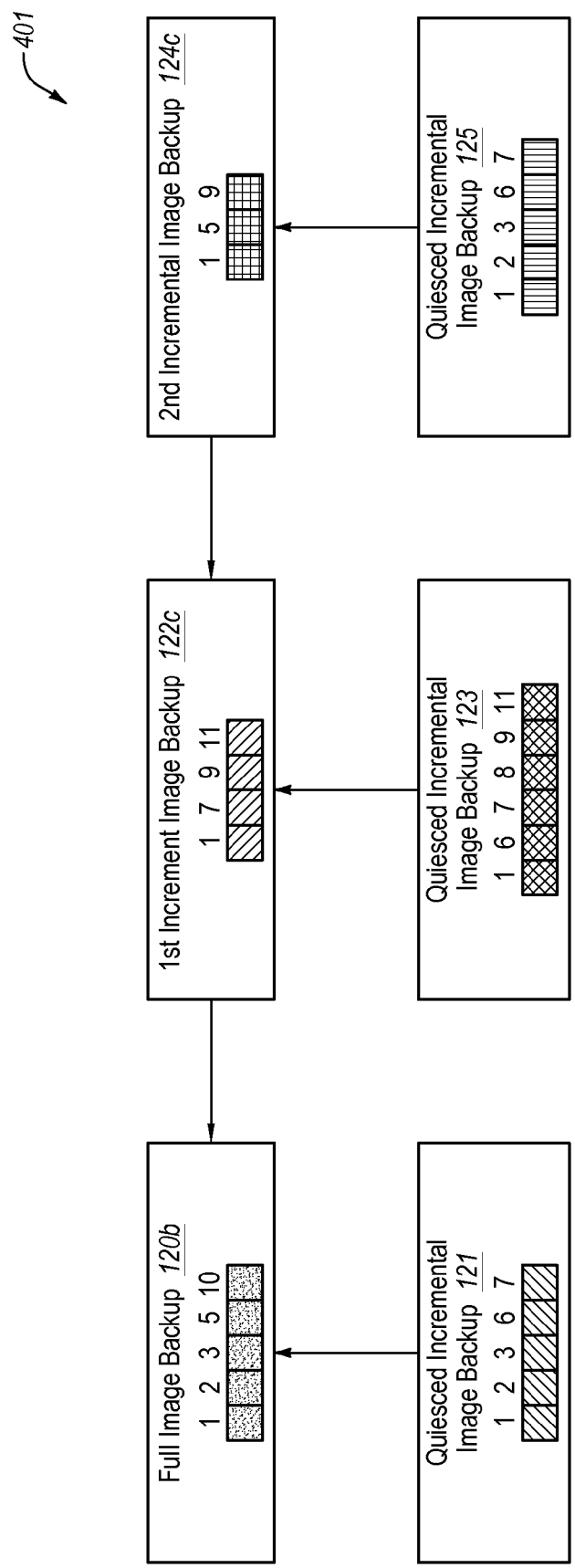
FIG. 4C is a schematic block diagram illustrating a branching image backup chain resulting from the timeline of FIGS. 4A-4B.

FIGS. 4A-4B are a schematic block diagram illustrating a timeline 400 of capturing post-snapshot quiescence writes in a branching image backup chain. FIG. 4C is a schematic block diagram illustrating a branching image backup chain 401 resulting from the timeline 400 of FIGS. 4A-4B. Since the timeline 400 of FIGS. 4A-4B is similar in many respects to the timeline 300 of FIGS. 3A-3B, those portions of the timeline 400 that differ from the timeline 300 will primarily be discussed in connection with FIGS. 4A-4B. FIGS. 4A-4B disclose the states of the source storage 108 at times t(1), t(1.2), t(2), t(2.3), t(3), and t(3.1), with the full image backup 120*b* representing the state of the source storage 108 at time t(1), the 1st incremental image backup 122*c* representing the state of the source storage at time t(2), and the 2nd incremental image backup 124*c* representing the state of the source storage at time t(3). However, as discussed in greater detail below, the image backups 120*b*, 122*c*, and 124*c* are paired with additional quiesced incremental image backups 121, 123, and 125 that include post-snapshot quiescence modifications, which makes the branching image backup chain 401 of FIG. 4C (which is made up of the image backups 120*b*, 122*c*, and 124*c* along with their paired quiesced incremental image backups 121, 123, and 125) more useful when it comes time to restore one or more backups in the branching image backup chain 401 to the restore storage 112 of FIG. 1.

As disclosed in FIG. 4A, the operations between time t(1) and time t(2), and the first few operations between time t(2) and time t(2.3) in the timeline 400 are identical to the corresponding operations in the timeline 300 of FIG. 3A. However, at time t(2) or beyond, block positions for the 1st incremental image backup 122*c* are calculated by performing a Boolean AND operation on the modify map 212 and the FSBAM 214, which results in incremental backup block positions map 422 listing positions (1), (7), (9), and (11).

Finally, at time t(2) or beyond, blocks identified in the incremental backup block positions map 422, namely the blocks in positions (1), (7), (9), and (11), are copied from the snapshot 216 to the 1st incremental image backup 122*c*. In addition, at time t(2.3) or beyond, blocks identified in the quiescence map 220 are copied from the quiesced snapshot 218 to a quiesced incremental image backup 123. The 1st incremental image backup 122*c* of FIG. 4A therefore represents the state of the source storage 108 at time t(2), and the quiesced incremental image backup 123 represents the post-snapshot quiescence modifications made to the snapshot 216, enabling the 1st incremental image backup 122*c* and the quiesced incremental image backup 123 to be restored together, which may make the 1st incremental image backup 122*c* more useful when it comes time to restore the 1st incremental image backup 122*c* to the restore storage 112 in FIG. 1.

As disclosed in FIGS. 4A and 4B, the modifications to the source storage 108 between time t(2) and time t(3), and the first few operations between time t(3) and time t(3.1) in the timeline 400 are identical to the corresponding operations in the timeline 300 of FIG. 3A. However, at time t(3) or beyond, block positions for the 2nd incremental image backup 124*c* are calculated by performing a Boolean AND operation on the modify map 224 and the FSBAM 226, which results in incremental backup block positions map 434 listing positions (1), (5), and (9).

Finally, at time t(3) or beyond, blocks identified in the incremental backup block positions map 434, namely the blocks in positions (1), (5), and (9), are copied from the snapshot 228 to the 2nd incremental image backup 124*c*. In addition, at time 3.1 or beyond, blocks identified in the quiescence map 232 are copied from the quiesced snapshot 230 to a quiesced incremental image backup 125. The 2nd incremental image backup 124*c* of FIG. 4B therefore represents the state of the source storage 108 at time t(3), and the quiesced incremental image backup 125 represents the post-snapshot quiescence modifications made to the snapshot 228, enabling the 2nd incremental image backup 124c and the quiesced incremental image backup 125 to be restored together, which may make the 2nd incremental image backup 124c more useful when it comes time to restore the 2nd incremental image backup 124c to the restore storage 112 of FIG. 1.

As disclosed in FIG. 4C, the timeline 400 of FIGS. 4A-4B results in the branching image backup chain 401 in which, on a first branch, the quiesced incremental backup 125 depends on the 2nd incremental image backup 124c, which depends on the 1st incremental image backup 122c, which depends on the full image backup 120b. On a second branch, the quiesced incremental image backup 123 depends on the 1st incremental image backup 122c, which depends on the full image backup 120b. On a third branch, the quiesced incremental image backup 121 depends on the full image backup 120b. Although the branching image backup chain 401 may be over-inclusive in that it may contain some blocks that are not needed in every restoration, the benefits of capturing the post-snapshot quiescence modifications in the branching image backup chain 401 may outweigh any increase in size due to over-inclusivity. In addition, during restoration of the branching image backup chain 401, it is understood that only a single branch may be restored, thus avoid traversing every image backup in the branching image backup chain 401, which may increase the speed and decrease the overhead of the restoration.

Figure 5:
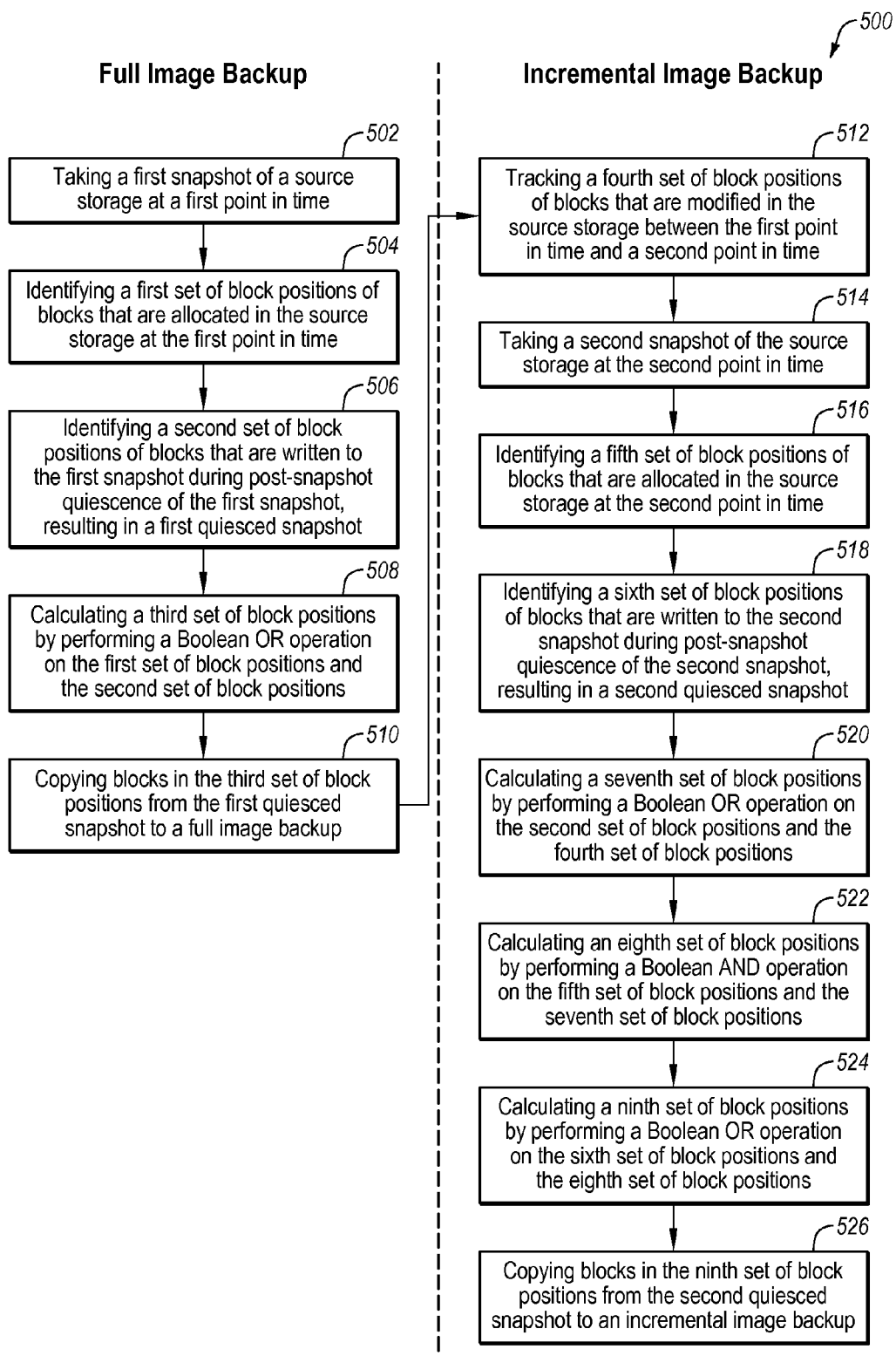
FIG. 5 is a schematic flowchart illustrating an example method for capturing post-snapshot quiescence writes in an image backup.
Figure 6:
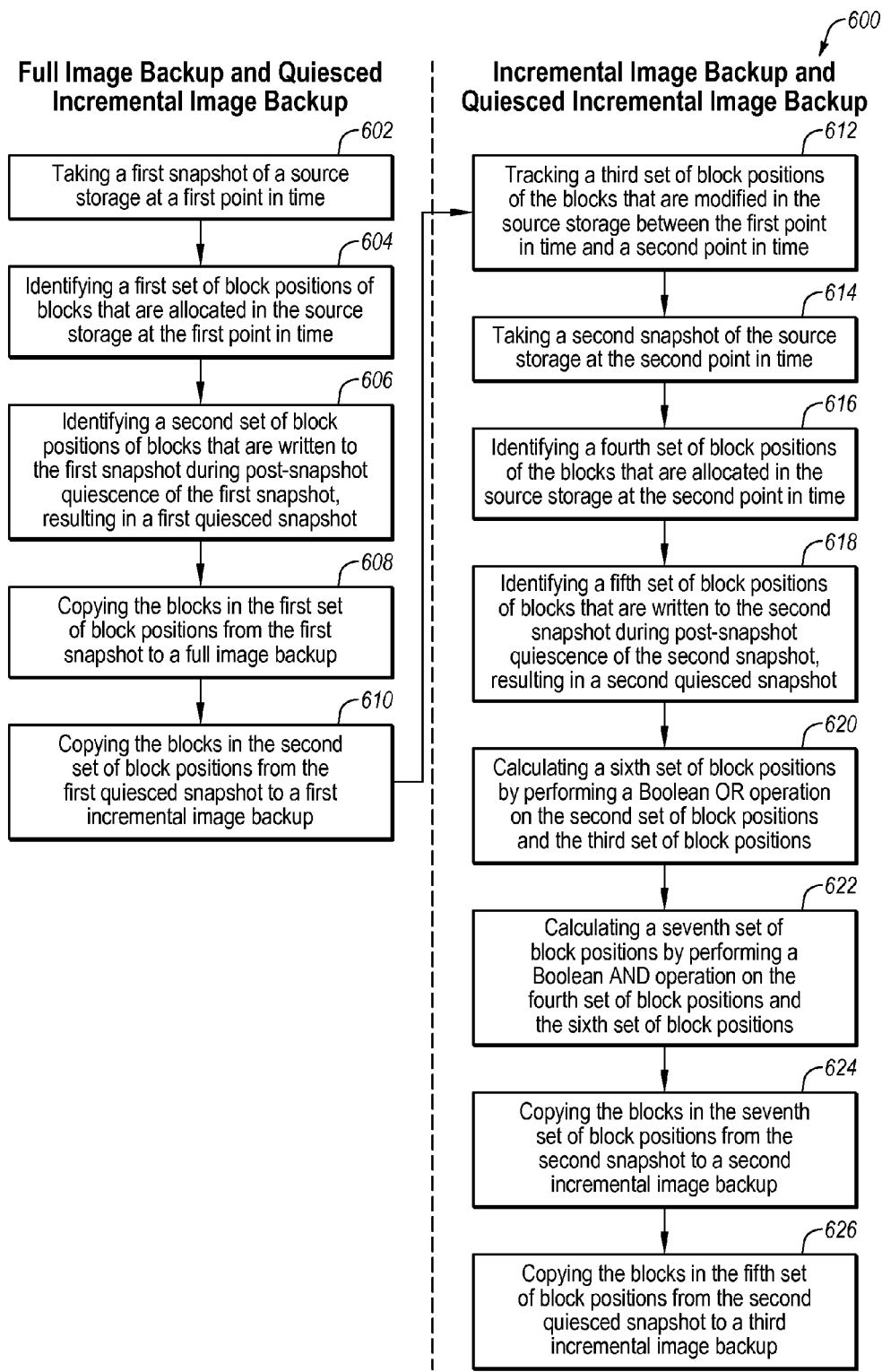
FIG. 6 is a schematic flowchart illustrating an example method for capturing post-snapshot quiescence writes in a linear image backup chain.
Figure 7:
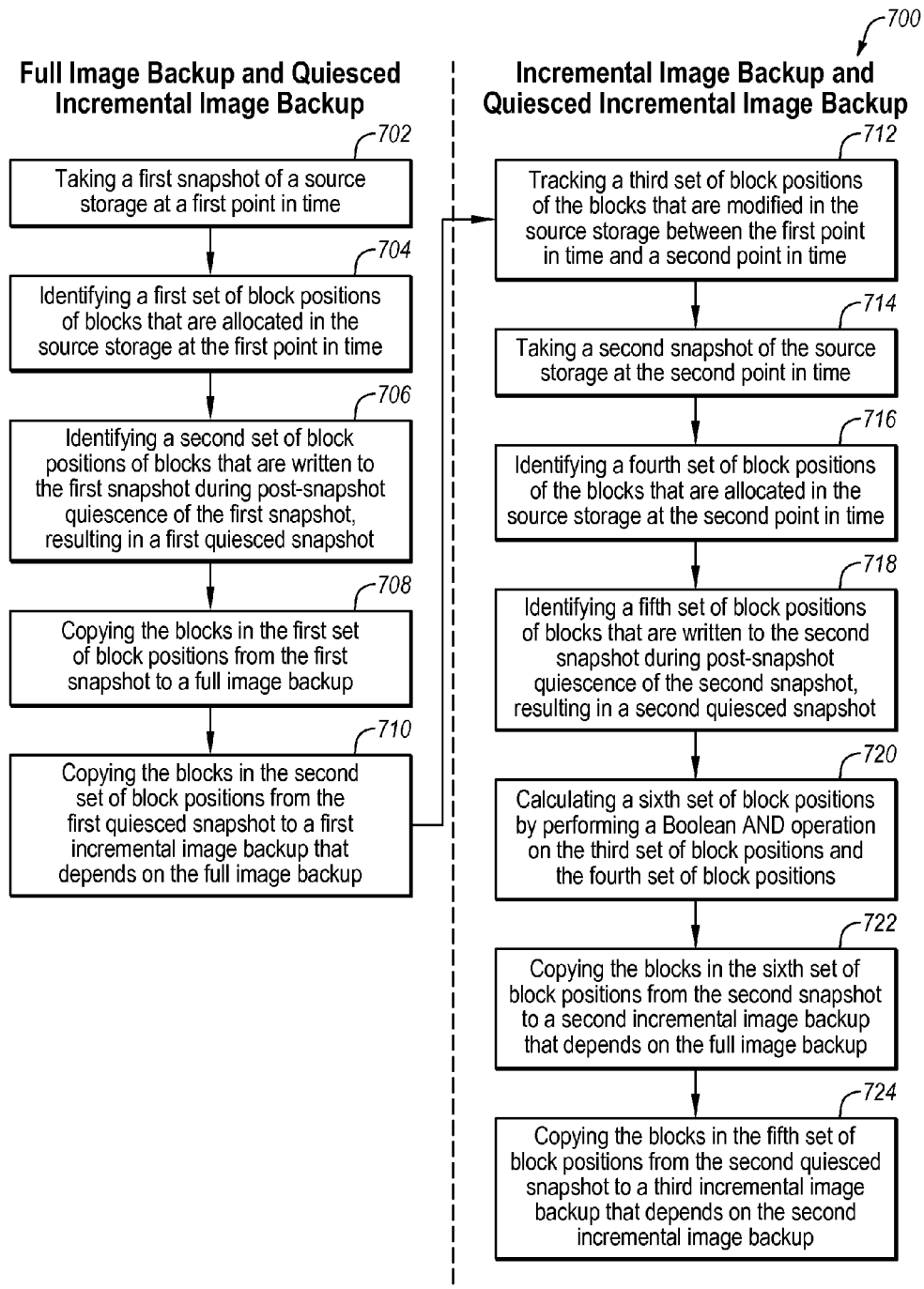
FIG. 7 is a schematic flowchart illustrating an example method for capturing post-snapshot quiescence writes in a branching image backup chain.

FIG. 5 is a schematic flowchart illustrating an example method 500 for capturing post-snapshot quiescence writes in an image backup. FIG. 6 is a schematic flowchart illustrating an example method 600 for capturing post-snapshot quiescence writes in a linear image backup chain. FIG. 7 is a schematic flowchart illustrating an example method 700 for capturing post-snapshot quiescence writes in a branching image backup chain. The methods 500, 600, and 700 may be implemented, in at least some embodiments, by the backup module 114 of FIG. 1. For example, the backup module 114 may be one or more programs, stored on one or more non-transitory computer-readable media, that are configured, when executed, to cause one or more processors to perform operations of the methods 500, 600, and 700, as represented by one or more of the steps of the methods 500, 600, and 700. Although illustrated as discrete steps, various steps may be divided into additional steps, combined into fewer steps, reordered, or eliminated, depending on the desired implementation. The method 500 will be discussed with reference to FIGS. 1, 2A-2C, and 5, the method 600 will be discussed with reference to FIGS. 1, 3A-3C, and 6, and the method 700 will be discussed with reference to FIGS. 1, 4A-4C, and 7.

The method 500 of FIG. 5 may include step 502 of taking a first snapshot of a source storage at a first point in time. For example, the backup module 114 of FIG. 1 may take the snapshot 204 of the source storage 108 at time t(1), as disclosed in FIG. 2A. This taking of the snapshot 204 at step 502 may be performed, for example, by a VSS.

The method 500 may include step 504 of identifying a first set of block positions of blocks that are allocated in the source storage at the first point in time. Continuing with the above example, the backup module 114 of FIG. 1 may identify, at step 504, the first set of block positions by accessing the FSBAM 202 of the source storage 108, that may be stored in the snapshot 204 or separately from the snapshot 204, which identifies a first set of block positions of blocks that are allocated in the source storage 108 at time t(1), as disclosed in FIG. 2A.

The method 500 may include step 506 of identifying a second set of block positions of blocks that are written to the first snapshot during post-snapshot quiescence of the first snapshot, resulting in a first quiesced snapshot. Continuing with the above example, the backup module 114 of FIG. 1 may access, at step 506, the quiescence map 208 of the snapshot 204, which identifies a second set of block positions of blocks that are written to the snapshot 204 during post-snapshot quiescence of the snapshot 204 that occurs between time t(1) and time t(1.2), resulting in the quiesced snapshot 206, as disclosed in FIG. 2A. The post-snapshot quiescence of the snapshot 204 at step 506 may be performed, for example, by a VSS and/or a VSS Writer.

The method 500 may include step 508 of calculating a third set of block positions by performing a Boolean OR operation on the first set of block positions and the second set of block positions. Continuing with the above example, the backup module 114 of FIG. 1 may calculate, at step 508, a third set of block positions by performing a Boolean OR operation on the first set of block positions from the FSBAM 202 and the second set of block positions from the quiescence map 208, as disclosed in FIG. 2A.

The method 500 may include step 510 of copying blocks in the third set of block positions from the first quiesced snapshot to a full image backup. Continuing with the above example, the backup module 114 of FIG. 1 may copy, at step 510, blocks in the third set of block positions, which was calculated at step 508, from the quiesced snapshot 206 to the full image backup 120a, as disclosed in FIG. 2A. After step 510, the full image backup 120a represents the state of the source storage 108 at time t(1), but with post-snapshot quiescence modifications, which may make the full image backup 120a more useful when it comes time to restore the full image backup 120a to the restore storage 112 of FIG. 1.

The method 500 may include step 512 of tracking a fourth set of block positions of blocks that are modified in the source storage between the first point in time and a second point in time. Continuing with the above example, the backup module 114 of FIG. 1 may track, at step 512, in the modify map 212, a fourth set of block positions of blocks that are modified in the source storage 108 between time t(1) and time t(2), as disclosed in FIG. 2A.

The method 500 may include step 514 of taking a second snapshot of the source storage at the second point in time. Continuing with the above example, the backup module 114 of FIG. 1 may take, at step 514, the snapshot 216 of the source storage 108 at time t(2), as disclosed in FIG. 2A. This taking of the snapshot 216 at step 514 may be performed, for example, by a VSS.

The method 500 may include step 516 of identifying a fifth set of block positions of blocks that are allocated in the source storage at the second point in time. Continuing with the above example, the backup module 114 of FIG. 1 may identify, at step 516, the fifth set of block positions by accessing the FSBAM 214 of the source storage 108, that may be stored in the snapshot 216 or separately from the snapshot 216, which identifies a fifth set of block positions of blocks that are allocated in the source storage 108 at time t(2), as disclosed in FIG. 2A.

The method 500 may include step 518 of identifying a sixth set of block positions of blocks that are written to the second snapshot during post-snapshot quiescence of the second snapshot, resulting in a second quiesced snapshot. Continuing with the above example, the backup module 114 of FIG. 1 may access, at step 518, the quiescence map 220 of FIG. 2A, which identifies block positions of blocks that are written to the snapshot 216 during post-snapshot quiescence of the snapshot 216, resulting in the quiesced snapshot 218. The post-snapshot quiescence of the snapshot 216 at step 518 may be performed, for example, by a VSS and/or a VSS Writer.

The method 500 may include step 520 of calculating a seventh set of block positions by performing a Boolean OR operation on the second set of block positions and the fourth set of block positions. Continuing with the above example, the backup module 114 of FIG. 1 may calculate, at step 520, a seventh set of block positions by performing a Boolean OR operation on the second set of block positions from the quiescence map 208 and the fourth set of block positions from the modify map 212, as disclosed in FIG. 2A.

The method 500 may include step 522 of calculating an eighth set of block positions by performing a Boolean AND operation on the fifth set of block positions and the seventh set of block positions. Continuing with the above example, the backup module 114 of FIG. 1 may calculate, at step 522, an eighth set of block positions by performing a Boolean AND operation on the fifth set of block positions from the FSBAM 214 of FIG. 2A and the seventh set of block positions that was calculated at step 520.

The method 500 may include step 524 of calculating a ninth set of block positions by performing a Boolean OR operation on the sixth set of block positions and the eighth set of block positions. Continuing with the above example, the backup module 114 of FIG. 1 may calculate, at step 524, a ninth set of block positions by performing a Boolean OR operation on the sixth set of block positions from the quiescence map 220 of FIG. 2A and the eighth set of block positions that was calculated at step 522.

The method 500 may include step 526 of copying blocks in the ninth set of block positions from the second quiesced snapshot to an incremental image backup. Continuing with the above example, the backup module 114 of FIG. 1 may copy, at step 526, blocks in the ninth set of block positions, which was calculated at step 524, from the quiesced snapshot 218 to the 1st incremental image backup 122a, as disclosed in FIG. 2A. After step 526, the 1st incremental image backup 122a represents the state of the source storage 108 at time t(2), but with post-snapshot quiescence modifications, which may make the 1st incremental image backup 122a more useful when it comes time to restore the 1st incremental image backup 122a to the restore storage 112 of FIG. 1.

It is understood that the foregoing discussion of the method 500 is but one possible implementation of a method for capturing post-snapshot quiescence writes in an image backup, and various modifications are possible and contemplated. For example, the method 500 may be modified to remove steps 512-526. In another example, the full image backup may be generated using a different method. In another example, the method 500 may be modified to remove one or more of the steps 502-510.

The method 600 of FIG. 6 may include steps 602, 604, and 606, which are identical to steps 502, 504, and 506, respectively, of the method 500 of FIG. 5.

The method 600 may include step 608 of copying blocks in the first set of block positions from the first snapshot to a full image backup. For example, the backup module 114 of FIG. 1 may copy, at step 608, blocks in the first set of block positions, which was calculated at step 604, from the snapshot 204 to the full image backup 120b of FIG. 3A.

The method 600 may include step 610 of copying blocks in the second set of block positions from the first quiesced snapshot to a first incremental backup. For example, the backup module 114 of FIG. 1 may copy, at step 610, blocks in the second set of block positions, which was calculated at step 606, from the quiesced snapshot 206 to the quiesced incremental image backup 121 of FIG. 3A.

After step 610, the full image backup 120b represents the state of the source storage 108 at time t(1), and the quiesced incremental image backup 121 represents the post-snapshot quiescence modifications made to the snapshot 204, enabling the full image backup 120b and the quiesced incremental image backup 121 to be restored together, which may make the full image backup 120b more useful when it comes time to restore the full image backup 120b to the restore storage 112.

The method 600 may include step 612 of tracking a third set of block positions of blocks that are modified in the source storage between the first point in time and a second point in time. Continuing with the above example, the backup module 114 of FIG. 1 may track, at step 612, in the modify map 212, a third set of block positions of blocks that are modified in the source storage 108 between time t(1) and time t(2), as disclosed in FIG. 3A.

The method 600 of FIG. 6 may include step 614, which is identical to the step 514 of the method 500 of FIG. 5.

The method 600 may include step 616 of identifying a fourth set of block positions of blocks that are allocated in the source storage at the second point in time. Continuing with the above example, the backup module 114 of FIG. 1 may identify, at step 616, the fourth set of block positions by accessing the FSBAM 214 of the source storage 108 that is stored in the snapshot 216, or alternately outside of the snapshot 216, which identifies a fourth set of block positions of blocks that are allocated in the source storage 108 at time t(2), as disclosed in FIG. 3A.

The method 600 may include step 618 of identifying a fifth set of block positions of blocks that are written to the second snapshot during post-snapshot quiescence of the second snapshot, resulting in a second quiesced snapshot. Continuing with the above example, the backup module 114 of FIG. 1 may access, at step 618, the quiescence map 220 of FIG. 2A, which identifies block positions of blocks that are written to the snapshot 216 during post-snapshot quiescence of the snapshot 216, resulting in the quiesced snapshot 218, as disclosed in FIG. 3A. The post-snapshot quiescence of the snapshot 216 at step 618 may be performed, for example, by a VSS and/or a VSS Writer.

The method 600 may include step 620 of calculating a sixth set of block positions by performing a Boolean OR operation on the second set of block positions and the third set of block positions. Continuing with the above example, the backup module 114 of FIG. 1 may calculate, at step 620, a sixth set of block positions by performing a Boolean OR operation on the second set of block positions from the quiescence map 208 and the third set of block positions from the modify map 212, as disclosed in FIG. 3A.

The method 600 may include step 622 of calculating a seventh set of block positions by performing a Boolean AND operation on the fourth set of block positions and the sixth set of block positions. Continuing with the above example, the backup module 114 of FIG. 1 may calculate, at step 622, a seventh set of block positions by performing a Boolean AND operation on the fourth set of block positions from the FSBAM 214 of FIG. 3A and the sixth set of block positions that was calculated at step 620.

The method 600 may include step 624 of copying blocks in the seventh set of block positions from the second snapshot to a second incremental image backup. Continuing with the above example, the backup module 114 of FIG. 1 may copy, at step 624, blocks in the seventh set of block positions, which was calculated at step 622, from the snapshot 216 to the 1st incremental image backup 122b of FIG. 3A.

The method 600 may include step 626 of copying blocks in the fifth set of block positions from the second quiesced snapshot to a third incremental image backup. Continuing with the above example, the backup module 114 of FIG. 1 may copy, at step 626, blocks in the fifth set of block positions, which was identified at step 618, from the second quiesced snapshot 218 to the quiesced incremental image backup 123 of FIG. 3A.

After step 626, the 1st incremental image backup 122b represents the state of the source storage 108 at time t(2), and the quiesced incremental image backup 123 represents the post-snapshot quiescence modifications made to the snapshot 216, enabling the 1st incremental image backup 122b and the quiesced incremental image backup 123 to be restored together, which may make the 1st incremental image backup 122b more useful when it comes time to restore the 1st incremental image backup 122b to the restore storage 112.

It is understood that the foregoing discussion of the method 600 is but one possible implementation of a method for capturing post-snapshot quiescence writes in a linear image backup chain, and various modifications are possible and contemplated. For example, the method 600 may be modified to remove steps 612-626. Additionally or alternatively, the steps 604, 608, and 610 may be omitted and the steps 602 and 606 may be performed during the creation of an incremental image backup (such as the 1st incremental image backup 122b of FIG. 3A) instead of during the creation of a full image backup (such as the full image backup 120b of FIG. 3A), and then the steps 612-626 may be performed during the creation of a subsequent incremental image backup (such as the 2nd incremental image backup 124b of FIG. 3B), with or without the creation of a quiesced incremental image backup that corresponds to the full incremental image backup that is positioned at the head of the image backup chain (such as the quiesced incremental image backup 121 of FIG. 3A).

The method 700 of FIG. 7 may include steps 702, 704, 706, 708, 710, 712, 714, 716, and 718, which are identical to steps 602, 604, 606, 608, 610, 612, 614, 616, and 618, respectively, of the method 600 of FIG. 6.

The method 700 may include step 720 of calculating a sixth set of block positions by performing a Boolean AND operation on the third set of block positions and the fourth set of block positions. For example, the backup module 114 of FIG. 1 may calculate, at step 720, a sixth set of block positions by performing a Boolean AND operation on the third set of block positions from the modify map 212 of FIG. 4A and the fourth set of block positions from the FSBAM 214 of FIG. 4A.

The method 700 may include step 722 of copying blocks in the sixth set of block positions from the second snapshot to a second incremental image backup that depends on the full image backup. Continuing with the above example, the backup module 114 of FIG. 1 may copy, at step 722, blocks in the sixth set of block positions, which was calculated at step 720, from the snapshot 216 to the 1st incremental image backup 122c of FIG. 4A.

The method 700 may include step 724 of copying blocks in the fifth set of block positions from the second quiesced snapshot to a third incremental image backup that depends on the second incremental image backup. Continuing with the above example, the backup module 114 of FIG. 1 may copy, at step 724, blocks in the fifth set of block positions, which was identified at step 718, from the second quiesced snapshot 218 to the quiesced incremental image backup 123 of FIG. 4A.

After step 724, the 1st incremental image backup 122c represents the state of the source storage 108 at time t(1), and the quiesced incremental image backup 123 represents the post-snapshot quiescence modifications made to the snapshot 216, enabling the 1st incremental image backup 122c and the quiesced incremental image backup 123 to be restored together, which may make the 1st incremental image backup 122c more useful when it comes time to restore the 1st incremental image backup 122c to the restore storage 112.

It is understood that the foregoing discussion of the method 700 is but one possible implementation of a method for capturing post-snapshot quiescence writes in a branching image backup chain, and various modifications are possible and contemplated. For example, the steps 704, 708, and 710 may be omitted and the steps 702 and 706 may be performed during the creation of an incremental image backup (such as the 1st incremental image backup 122c of FIG. 4A) instead of during the creation of a full image backup (such as the full image backup 120b of FIG. 4A), and then the steps 712-724 may be performed during the creation of a subsequent incremental image backup (such as the 2nd incremental image backup 124c of FIG. 4B), with or without the creation of a quiesced incremental image backup that corresponds to the full incremental image backup that is positioned at the head of the image backup chain (such as the quiesced incremental image backup 121 of FIG. 4A).

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules or filters described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method for capturing post-snapshot quiescence writes in an image backup, the method comprising:
   taking a first snapshot of a source storage at a first point in time;
   identifying a first set of block positions of blocks that are allocated in the source storage at the first point in time;
   identifying a second set of block positions of blocks that are written to the first snapshot during post-snapshot quiescence of the first snapshot, resulting in a first quiesced snapshot;
   calculating a third set of block positions by performing a Boolean OR operation on the first set of block positions and the second set of block positions;
   copying blocks in the third set of block positions from the first quiesced snapshot to a full image backup;
   tracking a fourth set of block positions of blocks that are modified in the source storage between the first point in time and a second point in time;
   taking a second snapshot of the source storage at the second point in time;
   identifying a fifth set of block positions of blocks that are allocated in the source storage at the second point in time;
   identifying a sixth set of block positions of blocks that are written to the second snapshot during post-snapshot quiescence of the second snapshot, resulting in a second quiesced snapshot;
   calculating a seventh set of block positions by performing a Boolean OR operation on the second set of block positions and the fourth set of block positions;
   calculating an eighth set of block positions by performing a Boolean AND operation on the fifth set of block positions and the seventh set of block positions;
   calculating a ninth set of block positions by performing a Boolean OR operation on the sixth set of block positions and the eighth set of block positions; and
   copying blocks in the ninth set of block positions from the second quiesced snapshot to an incremental image backup.

2. The method as recited in claim 1, wherein the taking of the first snapshot and the taking of the second snapshot are performed by a Volume Shadow Copy Service (VSS).

3. The method as recited in claim 2, wherein the post-snapshot quiescence of the first snapshot and the post-snapshot quiescence of the second snapshot are performed by the VSS.

4. The method as recited in claim 2, wherein the post-snapshot quiescence of the first snapshot and the post-snapshot quiescence of the second snapshot are performed by a VSS Writer.

5. The method as recited in claim 4, wherein the VSS Writer is an Active Directory (AD) service or a Hyper-V hypervisor.

6. The method as recited in claim 1, wherein the identifying of the first set of block positions is performed by accessing a first file system block allocation map (FSBAM) of the source storage that is stored in the first snapshot.

7. The method as recited in claim 6, wherein the identifying of the fifth set of block positions is performed by accessing a second FSBAM of the source storage that is stored in the second snapshot.

8. One or more non-transitory computer-readable media storing one or more programs that are configured, when executed, to cause one or more processors to perform the method as recited in claim 1.

9. A method for capturing post-snapshot quiescence writes in an image backup, the method comprising:
   taking a first snapshot of a source storage at a first point in time;
   accessing a first file system block allocation map (FSBAM) of the source storage from the first point in time, the first FSBAM identifying block positions of blocks that are allocated in the source storage at the first point in time;
   accessing a first quiescence map of the first snapshot, the first quiescence map identifying block positions of blocks that are written to the first snapshot during post-snapshot quiescence of the first snapshot, resulting in a first quiesced snapshot;
   calculating full backup block positions by performing a Boolean OR operation on the first FSBAM and the first quiescence map;
   copying blocks in the full backup block positions from the first quiesced snapshot to a full image backup;
   tracking, in a modify map, block positions of blocks that are modified in the source storage between the first point in time and a second point in time;
   taking a second snapshot of the source storage at the second point in time;
   accessing a second FSBAM of the source storage from the second point in time, the second FSBAM identifying block positions of blocks that are allocated in the source storage at the second point in time;
   accessing a second quiescence map of the second snapshot, the second quiescence map identifying block positions of blocks that are written to the second snapshot during post-snapshot quiescence of the second snapshot, resulting in a second quiesced snapshot;
   calculating incremental backup block positions by performing a Boolean OR operation on the first quiescence map and the modify map, then performing a Boolean AND operation with the second FSBAM, and then performing a Boolean OR operation with the second quiescence map; and
   copying blocks in the incremental backup block positions from the second quiesced snapshot to an incremental image backup.

10. The method as recited in claim 9, wherein the taking of the first snapshot and the taking of the second snapshot are performed by a Volume Shadow Copy Service (VSS).

11. The method as recited in claim 10, wherein the post-snapshot quiescence of the first snapshot and the post-snapshot quiescence of the second snapshot are performed by the VSS.

12. The method as recited in claim 10, wherein the post-snapshot quiescence of the first snapshot and the post-snapshot quiescence of the second snapshot are performed by a VSS Writer.

13. The method as recited in claim 12, wherein the VSS Writer is an Active Directory (AD) service or a Hyper-V hypervisor.

14. The method as recited in claim 9, wherein the first FSBAM is stored in the first snapshot.

15. The method as recited in claim 9, wherein the second FSBAM is stored in the second snapshot.

16. One or more non-transitory computer-readable media storing one or more programs that are configured, when executed, to cause one or more processors to perform the method as recited in claim 9.

* * * * *